US012726443B1

(12) United States Patent
Macneil et al.

(10) Patent No.: US 12,726,443 B1
(45) Date of Patent: Sep. 1, 2026

(54) SELF-ADJUSTING RESOURCE RATE LIMITING BASED ON A DYNAMIC TOKEN REFRESH INTERVAL

(71) Applicant: Juniper Networks, Inc., Sunnyvale, CA (US)

(72) Inventors: Erin C. Macneil, Carp (CA); Prashant Singh, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/661,991

(22) Filed: May 13, 2024

(51) Int. Cl.
*H04L 47/215* (2022.01)
*H04L 43/00* (2022.01)
*H04L 47/20* (2022.01)
*H04L 47/21* (2022.01)

(52) U.S. Cl.
CPC ............ *H04L 47/215* (2013.01); *H04L 43/00* (2013.01); *H04L 47/20* (2013.01); *H04L 47/21* (2013.01)

(58) Field of Classification Search
CPC ....... H04L 47/215; H04L 47/20; H04L 47/21; H04L 43/00
See application file for complete search history.

(56) References Cited

U.S. PATENT DOCUMENTS 7,602,721 B1 * 10/2009 Tangirala ............ H04L 41/0896 370/235.1
8,630,171 B2 1/2014 Alesi et al.
11,171,890 B1 11/2021 Matthews et al.
12,231,354 B1 * 2/2025 Matthews ............. H04L 47/215
2002/0114305 A1 * 8/2002 Oyama ............. H04M 15/8228 370/349
2009/0285095 A1 * 11/2009 Baden ..................... H04L 47/20 370/450
2010/0322071 A1 * 12/2010 Avdanin .............. H04L 47/2425 370/230
2011/0182179 A1 * 7/2011 Alesi ....................... H04L 47/10 370/230
2011/0243139 A1 * 10/2011 Nishimura ............ H04L 49/505 370/394
2014/0112147 A1 * 4/2014 Esposito ............... H04L 47/215 370/235.1
2020/0028788 A1 * 1/2020 Chen ........................ H04L 47/25
2023/0018767 A1 * 1/2023 Singh ..................... H04L 63/068
2024/0231630 A1 * 7/2024 Zharkov ............... G06F 3/0659

FOREIGN PATENT DOCUMENTS

CN 102047619 A 12/2014

* cited by examiner

*Primary Examiner* — Umar Cheema
*Assistant Examiner* — Adam A Cooney
(74) *Attorney, Agent, or Firm* — Harrity & Harrity, LLP

(57) ABSTRACT

A network device may determine a token refresh interval, and may generate tokens for a rate limiter based on the token refresh interval. The network device may receive packets or requests to be processed by the rate limiter, and may monitor a consumption of the tokens by the packets or requests during a time interval. The network device may adjust the token refresh interval based on the consumption and to generate a new token refresh interval, and may generate new tokens for the rate limiter based on the new token refresh interval.

20 Claims, 13 Drawing Sheets

SELF-ADJUSTING RESOURCE RATE LIMITING BASED ON A DYNAMIC TOKEN REFRESH INTERVAL

BACKGROUND

A network device may include a rate limiter or a policer. A rate limiter may be implemented using several models, such as a token bucket model, a leaky bucket model, a sliding window model, and/or the like.

SUMMARY

Some implementations described herein relate to a method. The method may include determining a token refresh interval, and generating tokens for a rate limiter based on the token refresh interval. The method may include receiving packets or requests to be processed by the rate limiter, and adjusting the token refresh interval to generate a new token refresh interval. The method may include generating new tokens for the rate limiter based on the new token refresh interval.

Some implementations described herein relate to a network device. The network device may include one or more memories and one or more processors. The one or more processors may be configured to determine a token refresh interval, and generate tokens for a rate limiter based on the token refresh interval. The one or more processors may be configured to receive packets or requests to be processed by the rate limiter, and monitor a consumption of the tokens by the packets or requests during a time interval. The one or more processors may be configured to adjust the token refresh interval based on the consumption and to generate a new token refresh interval. The one or more processors may be configured to generate new tokens for the rate limiter based on the new token refresh interval.

Some implementations described herein relate to a non-transitory computer-readable medium that stores a set of instructions. The set of instructions, when executed by one or more processors of a network device, may cause the network device to determine a token refresh interval, and generate tokens for a rate limiter based on the token refresh interval. The set of instructions, when executed by one or more processors of the network device, may cause the network device to receive packets or requests to be processed by the rate limiter, and determine a current time that the rate limiter is depleted of the tokens. The set of instructions, when executed by one or more processors of the network device, may cause the network device to determine a token exhaustion interval based on the current time and a last refresh time that the tokens are generated, and adjust the token refresh interval based on the token exhaustion interval and to generate a new token refresh interval. The set of instructions, when executed by one or more processors of the network device, may cause the network device to generate new tokens for the rate limiter based on the new token refresh interval.

DETAILED DESCRIPTION

Figure 1A:
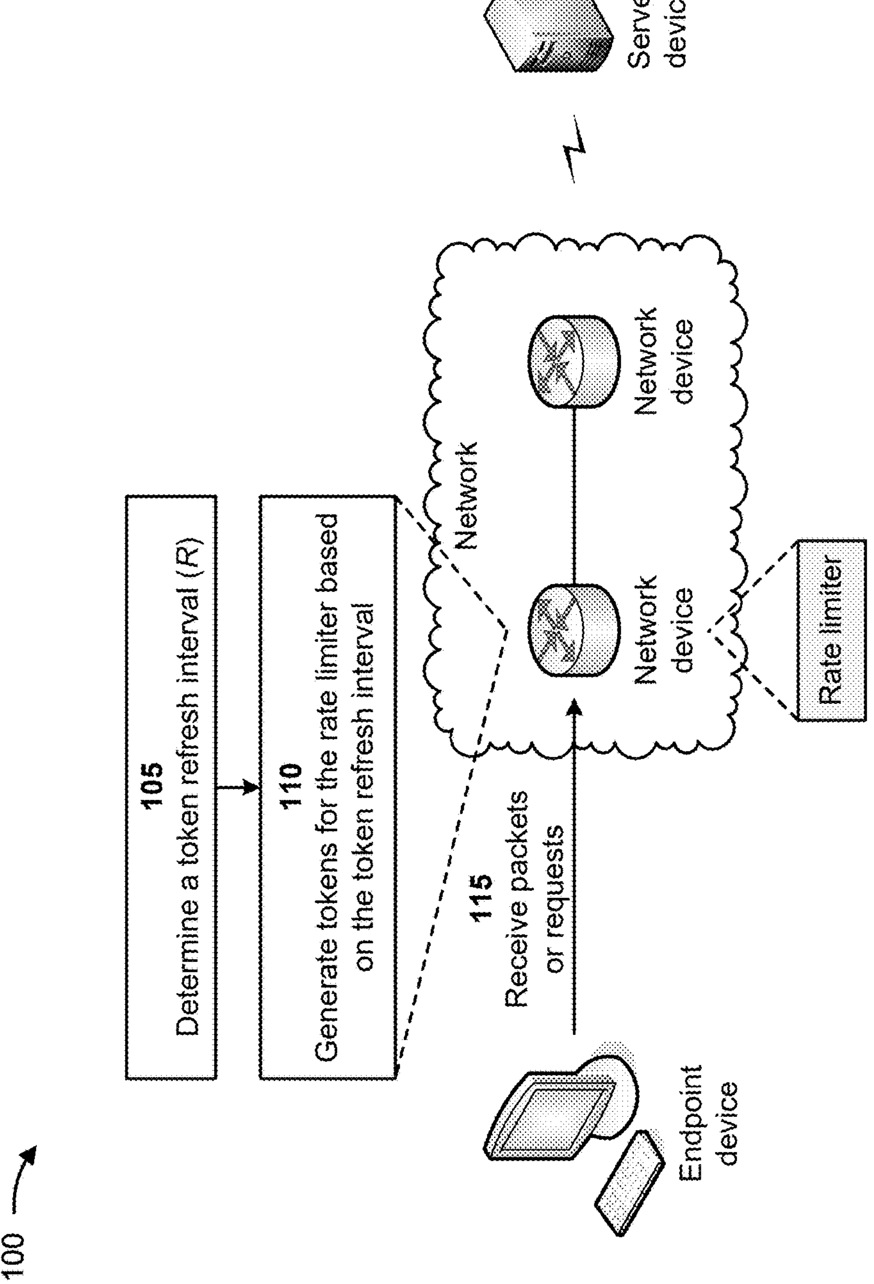
FIGS. 1A-1I are diagrams of an example associated with self-adjusting resource rate limiting based on a dynamic token refresh interval.

The following detailed description of example implementations refers to the accompanying drawings. The same reference numbers in different drawings may identify the same or similar elements.

A rate limiter of a network device may utilize a token bucket model that generates tokens at a regular pre-defined interval (e.g., a static token refresh interval). The network device may utilize the tokens to permit processing of packets or requests received by the network device. If the tokens are depleted prior to the beginning of a next static token refresh interval, the network device may cease processing packets or requests, and may drop the remaining packets or requests until new tokens are generated at the next static token refresh interval. Current token rate configurations for a rate limiter, where tokens are statically refreshed at a configured interval, do not adequately prepare the rate limiter against burst attacks. For example, after initial packets associated with a burst attack (e.g., a denial-of-service attack) are processed, remaining packets of the burst attack may quickly consume all the generated tokens for the static token refresh interval, leaving subsequent packets or requests to be dropped until new tokens are generated at the next static token refresh interval. Thus, current techniques for utilizing a rate limiter consume computing resources (e.g., processing resources, memory resources, communication resources, and/or the like), networking resources, and/or the like are associated with processing illegitimate packets or requests associated with a burst data attack (e.g., a denial-of-service (DOS) attack, a distributed denial-of-service (DDoS) attack, and/or the like), handling customer complaints associated with legitimate packets or requests lost during the burst data attack due, and/or the like.

Some implementations described herein relate to a network device that provides self-adjusting resource rate limiting based on a dynamic token refresh interval. For example, the network device may determine a token refresh interval, and may generate tokens for a rate limiter based on the token refresh interval. The network device may receive packets or requests to be processed by the rate limiter, and may monitor a consumption of the tokens by the packets or requests during a time interval. The network device may adjust the token refresh interval based on the consumption and to generate a new token refresh interval, and may generate new tokens for the rate limiter based on the new (adjusted) token refresh interval.

In this way, the network device provides self-adjusting resource rate limiting based on a dynamic token refresh interval. For example, the network device may include a rate limiter that adapts to various forms of denial-of-service attacks (e.g., a burst attack) and protects against such denial-of-service attacks. The rate limiter may utilize a token bucket model with a token refresh interval that is more granularly enforced and dynamically tuned, so that the rate limiter may better adjust to traffic fluctuations and denial-of-service attacks. Thus, the network device conserves computing resources, networking resources, and/or the like that would otherwise have been consumed by processing illegitimate packets or requests associated with a burst data attack, handling customer complaints associated with legitimate packets or requests lost during the burst data attack due, and/or the like.

FIGS. 1A-1I are diagrams of an example 100 associated with self-adjusting resource rate limiting based on a dynamic token refresh interval. As shown in FIGS. 1A-1I, the example 100 includes an endpoint device associated with a network and a server device. The network may include multiple network devices, and each of the network devices may include a rate limiter or a policer. Further details of the endpoint device, the server device, the network, the network devices, and the rate limiter are provided elsewhere herein.

As shown in FIG. 1A, and by reference number 105, the network device may determine a token refresh interval (R). For example, the rate limiter of the network device may be implemented using several models, such as a token bucket model, a leaky bucket model, a sliding window model, and/or the like. The rate limiter of the network device may utilize a model (e.g., a token bucket model) that generates tokens at a regular pre-defined interval (e.g., the token refresh interval). The network device may utilize the tokens to permit processing of packets or requests received by the network device. If the tokens are depleted prior to the token refresh interval, the network device may cease processing packets or requests, and may drop the remaining packets or requests until new tokens are generated at the next token refresh interval.

As further shown in FIG. 1A, and by reference number 110, the network device may generate tokens for a rate limiter based on the token refresh interval. For example, the rate limiter of the network device may utilize a model (e.g., a token bucket model) that generates tokens at the token refresh interval. The network device may utilize the tokens to permit processing of packets or requests received by the network device. In some implementations, the rate limiter of the network device may utilize a token bucket model with an adjustable token refresh interval that is more granularly enforced and dynamically tuned, so that the rate limiter may better adjust to traffic fluctuations and denial-of-service attacks. Thus, the token refresh interval may be a dynamic token refresh interval.

As further shown in FIG. 1A, and by reference number 115, the network device may receive packets or requests to be processed by the rate limiter. For example, the network device may receive the packets or requests (e.g., destined for the server device) from the endpoint device, may receive the packets or requests (e.g., destined for the endpoint device) from the server device, and/or the like. The rate limiter of the network device may utilize the model (e.g., a token bucket model) to generate the tokens at the token refresh interval. The network device may utilize the tokens to permit processing of the packets or requests received by the network device. If the tokens are depleted prior to the token refresh interval, the network device may cease processing the packets or requests, and may drop the remaining packets or requests until new tokens are generated at the next token refresh interval.

Figure 1B:
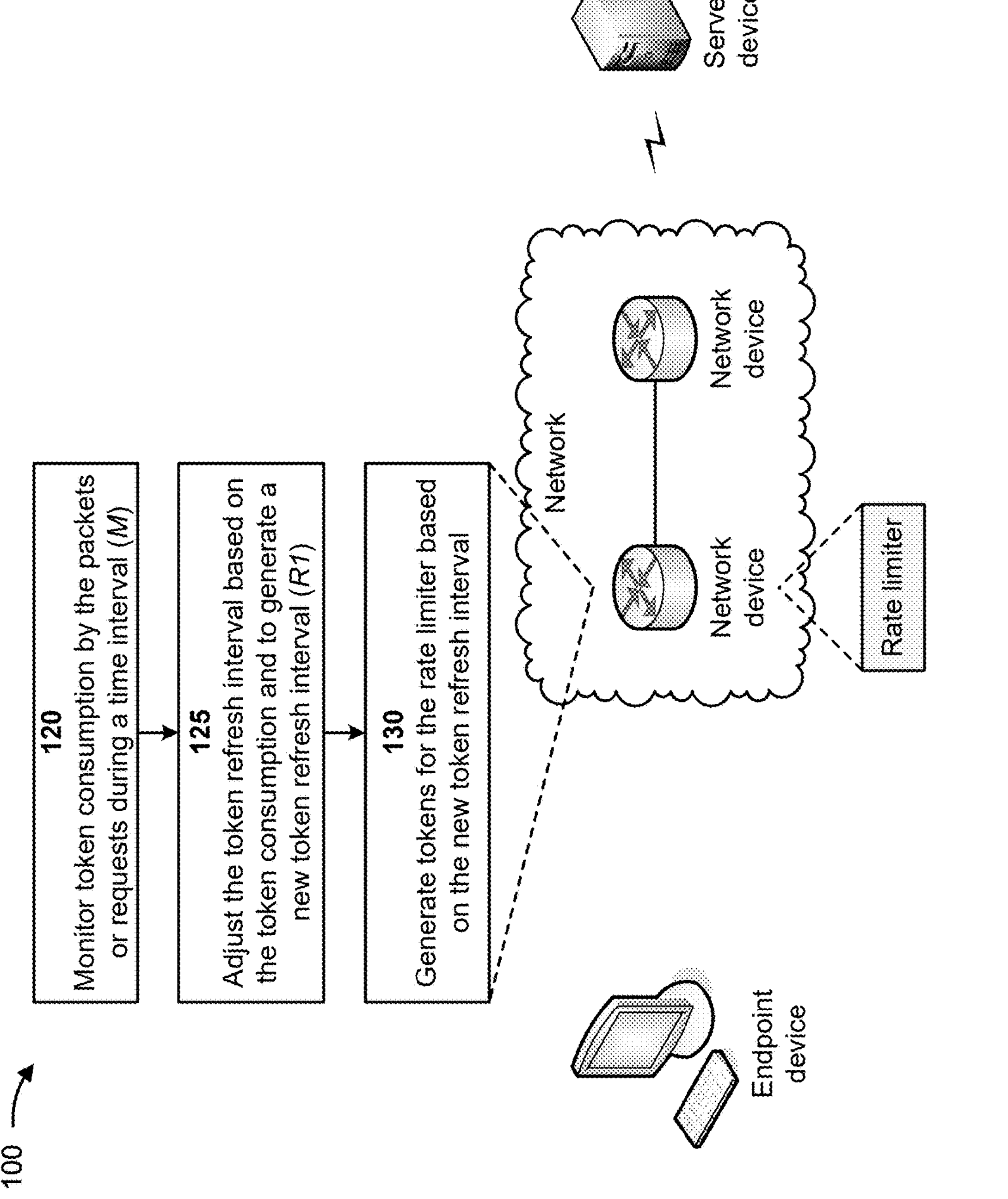

As shown in FIG. 1B, and by reference number 120, the network device may monitor token consumption by the packets or requests during a time interval (M). For example, the network device may monitor a rate of token consumption (e.g., for processing the packets or requests) by the rate limiter, and packet or request drops by the rate limiter, during a monitoring time interval (M). The monitoring time interval may be a more granular interval (e.g., a fraction) of the token refresh interval. In some implementations, the network device may identify a large token consumption by the packets or requests during the time interval (e.g., such as would occur during a denial-of-service attack). Alternatively, the network device may identify a small token consumption by the packets or request during the time interval (e.g., such as would occur during normal operating conditions).

As further shown in FIG. 1B, and by reference number 125, the network device may adjust the token refresh interval based on the token consumption and to generate a new token refresh interval (RI). For example, when the network device identifies a large token consumption by the packets or requests during the time interval, the network device may adjust the token refresh interval based on the large token consumption and to generate the new token refresh interval. Alternatively, when the network device identifies a small token consumption by the packets or request during the time interval, the network device may not adjust the token refresh interval, based on the small token consumption, and may maintain the token refresh interval.

As further shown in FIG. 1B, and by reference number 130, the network device may generate tokens for the rate limiter based on the new token refresh interval. For example, when the network device adjusts the token refresh interval based on the large token consumption and to generate the new token refresh interval, the rate limiter of the network device may generate new tokens based on the new token refresh interval. In some implementations, the new token refresh interval may be shorter than the token refresh interval. Thus, the rate limiter may generate the new tokens at a faster rate with the new token refresh interval than generated by the rate limiter with the token refresh interval.

Figure 1C:
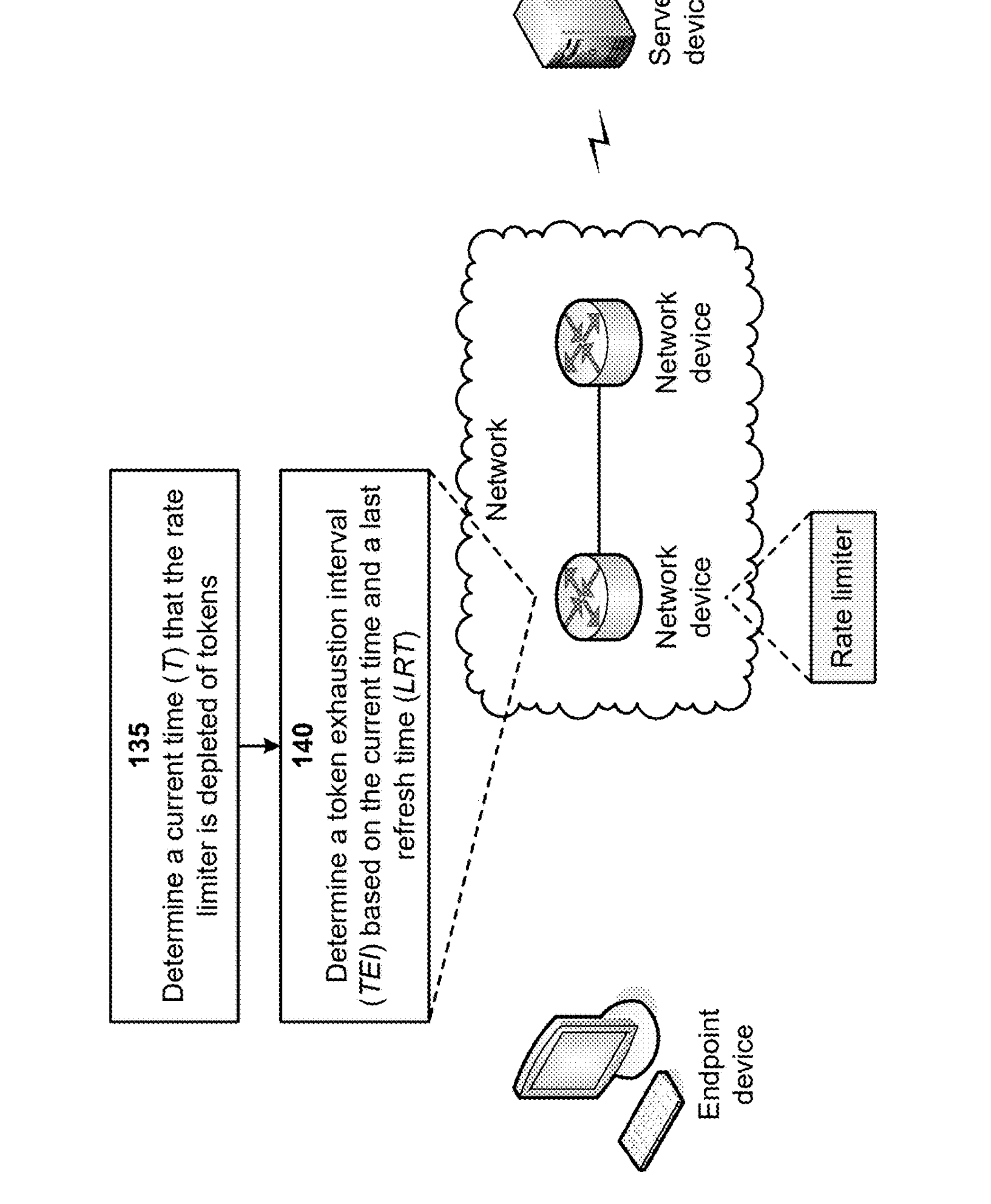

As shown in FIG. 1C, and by reference number 135, the network device may determine a current time (T) at which the rate limiter is depleted of tokens. For example, and alternatively to monitoring the token consumption and packet or request drop rate by the rate limiter, the network device may determine a current time (T) at which the rate limiter is depleted of tokens and is going to drop a packet or a request. The network device may determine a last refresh time (LRT) (e.g., maintained by the rate limiter) based on determining the current time at which the rate limiter is depleted of tokens and is going to drop a packet or a request.

As further shown in FIG. 1C, and by reference number 140, the network device may determine a token exhaustion interval (TEI) based on the current time and the last refresh time. For example, the network device may subtract the last refresh time (LRT) from the current time (T) to calculate the token exhaustion interval (e.g., TEI=T−LRT) associated with the rate limiter. The network device may utilize the token exhaustion interval to calculate a current burst rate or a token consumption rate of the rate limiter since the last refresh time (e.g., where the token consumption rate is calculated by dividing a current quantity of generate tokens by the token exhaustion interval). In some implementations, the network device may utilize the token exhaustion interval to determine whether to adjust the token refresh interval.

Figure 1D:
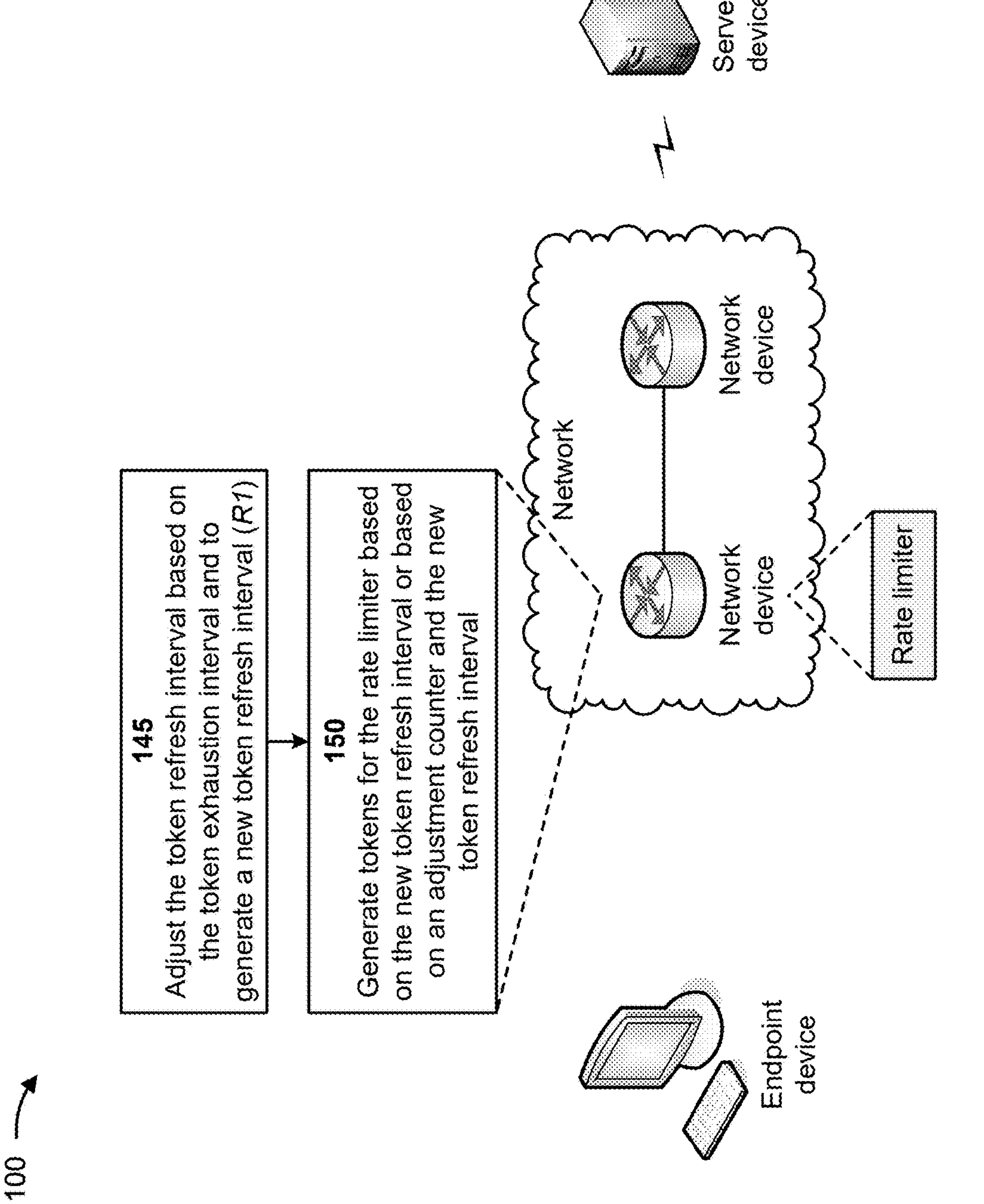

As shown in FIG. 1D, and by reference number 145, the network device may adjust the token refresh interval based on the token exhaustion interval and to generate a new token refresh interval (RI). For example, when all of the generated tokens have been consumed by the rate limiter, the network device may adjust the token refresh interval to generate the new token refresh interval. In some implementations, the network device may generate the new token refresh interval based on the token exhaustion interval. Such an approach may eliminate a need for periodic monitoring of token consumption by the network device, which may conserve resources at the network device.

In some implementations, the network device may evaluate the token exhaustion interval against the token refresh interval. If the token exhaustion interval is substantially similar to the token refresh interval and the tokens are depleted near expiry of the token refresh interval (e.g., a next token refresh is imminent), the network device may not adjust the token refresh interval based on the token exhaustion interval and may maintain the token refresh interval for the rate limiter.

As further shown in FIG. 1D, and by reference number 150, the network device may generate tokens for the rate limiter based on the new (adjusted) token refresh interval or based on an adjustment counter and the new token refresh interval. For example, when the network device adjusts the token refresh interval based on the token exhaustion interval and to generate the new token refresh interval, the rate limiter of the network device may generate new tokens based on the new token refresh interval. In some implementations, the new token refresh interval may be shorter than the token refresh interval. Thus, the rate limiter may generate the new tokens at a faster rate with the new token refresh interval than generated by the rate limiter with the token refresh interval.

In some implementations, when the network device adjusts the token refresh interval based on the token exhaustion interval and to generate the new token refresh interval, the rate limiter of the network device may generate new tokens based on the new token refresh interval and a configured adjustment counter (n). In such implementations, the network device may calculate the new token refresh interval and generate new tokens based on the new token refresh interval only after the network device experiences n (e.g., the adjustment counter) consecutive refresh intervals where packet or request drops have occurred.

Figure 1E:
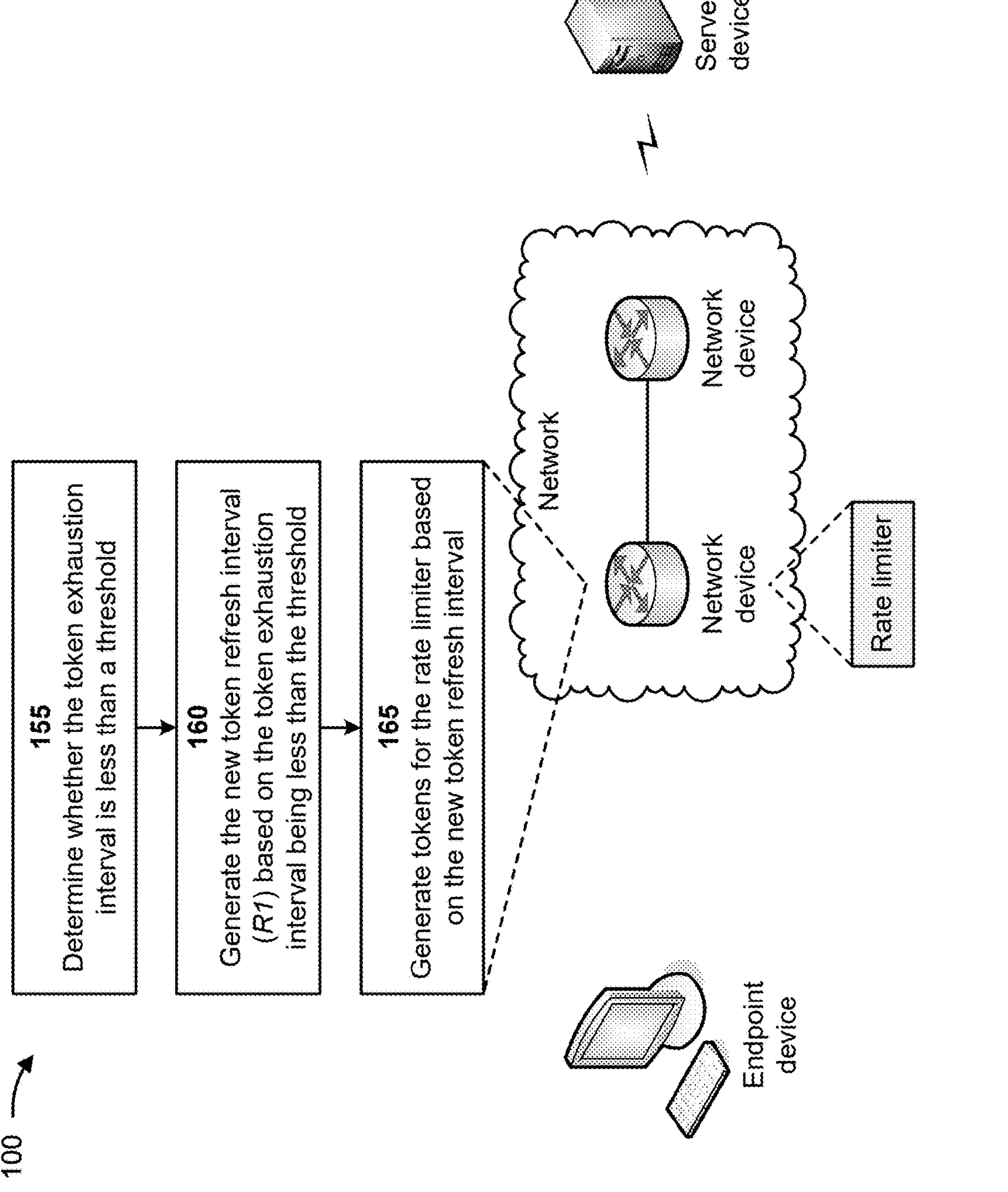

As shown in FIG. 1E, and by reference number 155, the network device may determine whether the token exhaustion interval is less than a threshold. For example, the network device may determine a threshold (e.g., a token exhaustion interval threshold (tei %)) by dividing the token exhaustion interval by the token refresh interval to generate a result, and multiplying the result by one hundred to generate a percentage. The network device may determine whether the token exhaustion interval is less than the token exhaustion interval threshold (tei %). In some implementations, the network device may determine that the token exhaustion interval is less than the token exhaustion interval threshold. Alternatively, the network device may determine that the token exhaustion interval is not less than the token exhaustion interval threshold.

As further shown in FIG. 1E, and by reference number 160, the network device may generate the new token refresh interval (RI) based on the token exhaustion interval being less than the threshold. For example, when the network device determines that the token exhaustion interval is less than the token exhaustion interval threshold, the network device may generate the new token refresh interval. Once the burst and rate limiter drops are detected, the network device may apply the new token refresh interval upon expiration of a last token refresh interval. Alternatively, when the network device determines that the token exhaustion interval is not less than the token exhaustion interval threshold, the network device may not generate the new token refresh interval and may maintain the token refresh interval for the rate limiter.

As further shown in FIG. 1E, and by reference number 165, the network device may generate tokens for the rate limiter based on the new token refresh interval. For example, when the network device generates the new token refresh interval based on the token exhaustion interval being less than the threshold, the rate limiter of the network device may generate new tokens based on the new token refresh interval. In some implementations, the new token refresh interval may be shorter than the token refresh interval. Thus, the rate limiter may generate the new tokens at a faster rate with the new token refresh interval than generated by the rate limiter with the token refresh interval.

In some implementations, the network device may utilize the adjustment counter (n) (e.g., a quantity of refresh intervals where packet drops have occurred) and the token exhaustion interval threshold (tei %) to enable the network device to better identify actual denial-of-service attacks as compared to network spikes and/or delays in actual traffic. In some implementations, maintaining the last refresh time (e.g., a time when the tokens are last refreshed) may enable the network device to calculate the token exhaustion interval (e.g., a time of token exhaustion). The network device may utilize the token exhaustion interval to estimate an incoming traffic rate (e.g., a token generation rate/token exhaustion interval) for an interval, and to obtain information about when tokens are depleted in the token refresh window (e.g., for comparison against the burst data threshold). For example, the network device may include a 1000 token/second single shot rate limiter with a tei % of 80%, may receive 1000 packets within first 0.5 seconds, at a one second timeline, and may experience a drop during a time (T) of 1.5 seconds. In such an example, the last refresh time may be one (1) second, the refresh interval may be one (1) second, and a next refresh may occur at two (2) seconds. The network device may calculate the token exhaustion interval (TEI) by subtracting the last refresh time (LRT) from the time (T) (e.g., TEI=T−LRT=1.5−1=0.5 seconds), and may calculate the token exhaustion interval threshold (tei %) (e.g., tei %=TEI/refresh interval*100=0.5/1*100=50%). The token exhaustion interval threshold of 50% may be less than the configured tei % of 80%, and so this may be considered a denial-of-service drop and may be used when deciding whether to change to a more aggressive token generation mode.

Figure 1F:
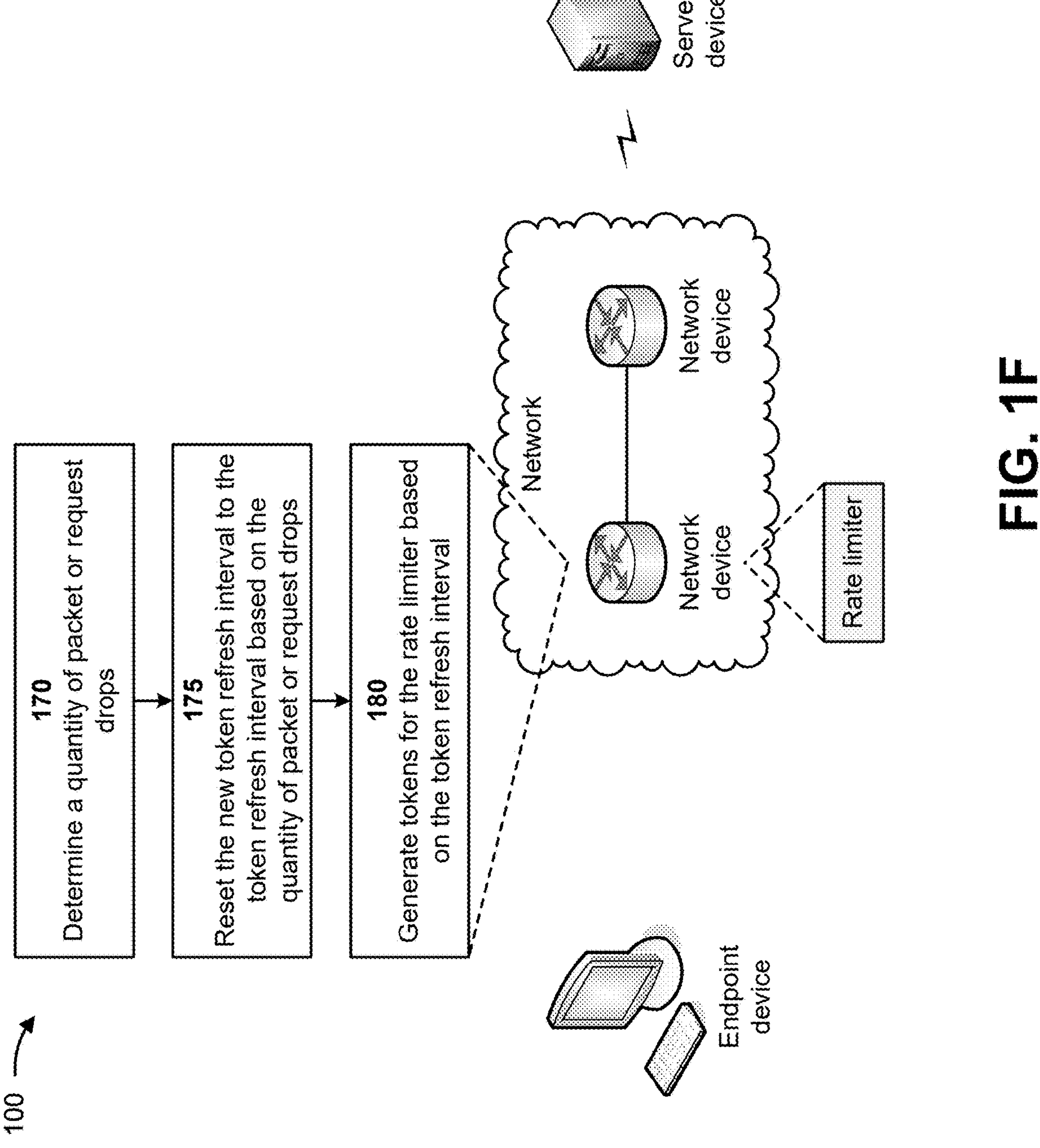

As shown in FIG. 1F, and by reference number 170, the network device may determine a quantity of packet or request drops. For example, when the network device causes the rate limiter to generate tokens at more aggressive intervals, an additional load may be applied to resources of the network device. Thus, the network device may utilize the more aggressive token generation intervals when needed and useful for the network device. In some implementations, in order to determine whether the more aggressive token generation intervals are needed, the network device may determine a quantity of packet or request drops over time.

As further shown in FIG. 1F, and by reference number 175, the network device may reset the new token refresh interval to the token refresh interval based on the quantity of packet or request drops. For example, if the quantity of packet or request drops is approximately zero (e.g., no new drops are detected), the network device may slowly decay the new token refresh interval back to the token refresh interval or the previously used refresh intervals over time. Alternatively, the network device may reset the new token refresh interval back to the token refresh interval in one shot when the quantity of packet or request drops is approximately zero (e.g., no new drops are detected). These retraction parameters can be configured by a user of the network device as a retraction interval (RI) and a scheme to utilize for retraction. In some implementations, the network device may maintain the new token refresh interval within bounds of the token refresh interval and a minimum token refresh interval (e.g., determined for optimal rate limiter performance).

As further shown in FIG. 1F, and by reference number 180, the network device may generate tokens for the rate limiter based on the token refresh interval. For example, when the network device resets the new token refresh interval to the token refresh interval based on the quantity of packet or request drops, the rate limiter of the network device may utilize a model (e.g., a token bucket model) that generates tokens at the token refresh interval. The network device may utilize the tokens to permit processing of packets or requests received by the network device.

In one example, the rate limiter of the network device may utilize a token refresh interval that generates 1000 tokens/second. The network device may monitor token consumption every 100 milliseconds, 10 milliseconds, or 1 millisecond at different intervals (e.g., progressively from 1 second to 100 milliseconds, from 100 milliseconds to 10 milliseconds, or from 10 milliseconds to 1 millisecond). A packet rate, a token consumption rate, and token exhaustion information may be checked by the network device. If the token consumption rate exceeds the static token rate (e.g., 1000 tokens/second) and the rate limiter drops traffic in the first 100 milliseconds, the token refresh rate can be updated to 100 tokens/100 milliseconds for a next interval and the token refresh interval may be changed to 100 milliseconds. The network device may select a minimum granularity for tuning the refresh interval based on optimal rate limiter performance. This may ensure that the tokens are slowly released over time and if there is a burst in the first 100 milliseconds (e.g., which would exhaust all of the tokens), the rate limiter may include some tokens for the remaining 900 milliseconds for subsequent traffic.

Figure 1G:
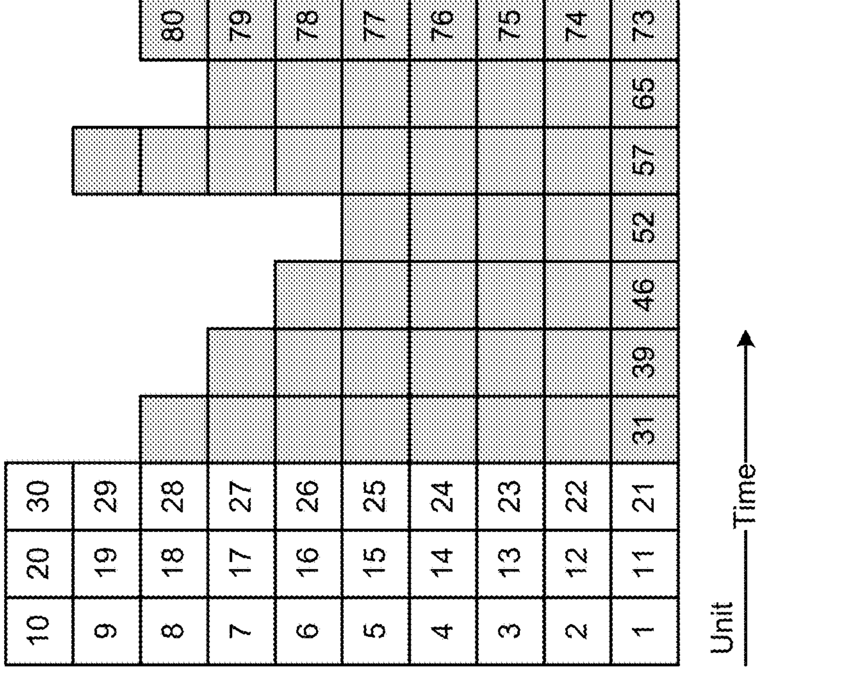

FIG. 1G depicts an example of utilizing the token refresh interval. For example, the token refresh interval may be configured at 10 units of time and may cause the rate limiter to generate 30 tokens at the start of the token refresh interval. Thus, the rate limiter may allow the initial 30 packets to be processed and may cause the remaining 50 packets to be dropped. However, the allowed first 30 packets may be part of a burst attack.

Figure 1H:
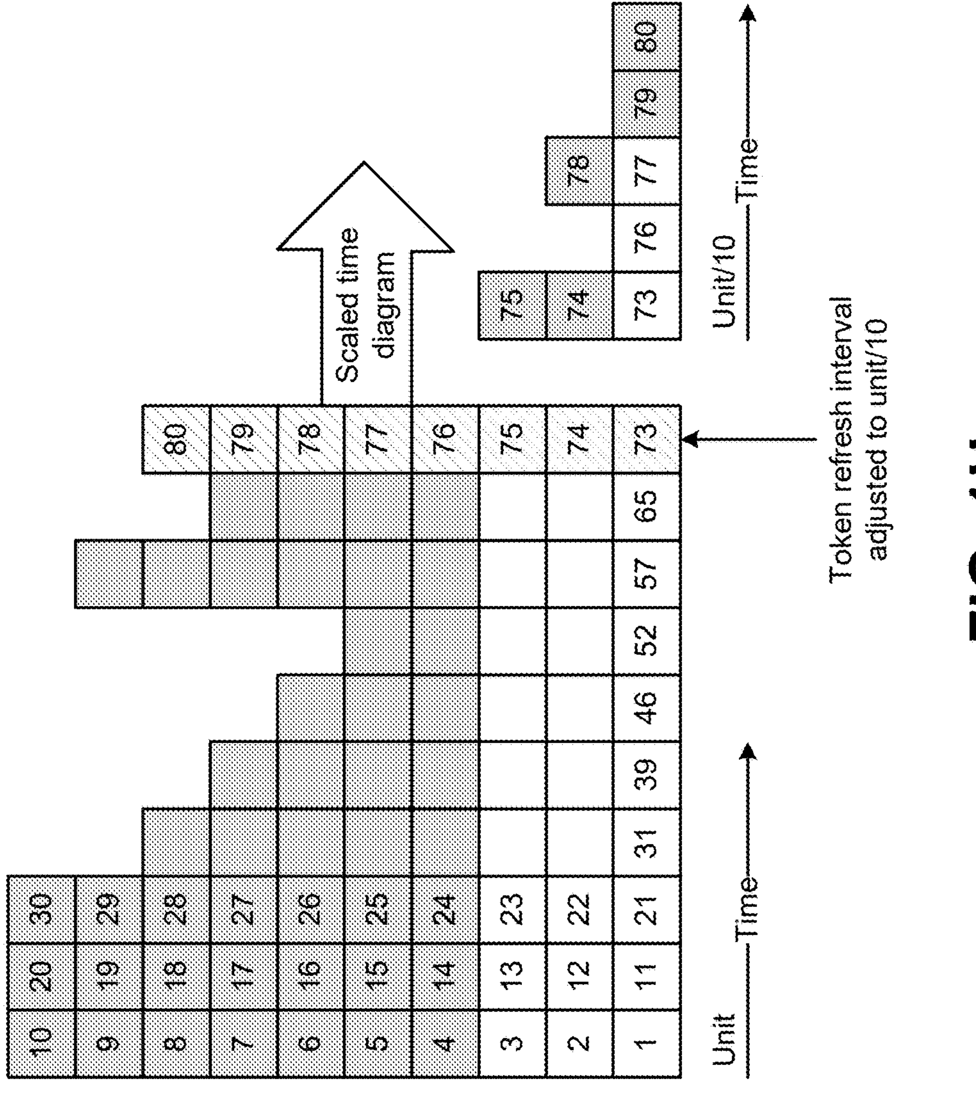

FIG. 1H depicts an example of adjusting the token refresh interval to a new token refresh interval. For example, the network device may detect the burst attack and may change the token refresh interval to 1 unit of time (e.g., 1/10 of the token refresh interval) and change the rate to 3 tokens per time unit. This may allow packets through in a more even way and may provide better chances to any subsequent traffic in the interval. Note that in FIG. 1H, after the ninth unit (e.g., an adjustment counter (n), which is a quantity of intervals where drops occur and the token refresh interval is adjusted), the refresh interval is again adjusted to a unit of time divided by ten (e.g., 1/10th of the current refresh interval) and may cause the rate limiter to generate only 1 token per new interval (for the first three intervals). In the example of FIG. 1H, the overall token rate is not changed for the rate limiter, and only the distribution of the token generation over time is altered. If the rate limiter utilizes a leaky bucket model (e.g., where traffic is put in a queue or bucket and a depth of a bucket is checked for fullness), the network device may dynamically adjust the depth of the bucket.

Figure 1I:
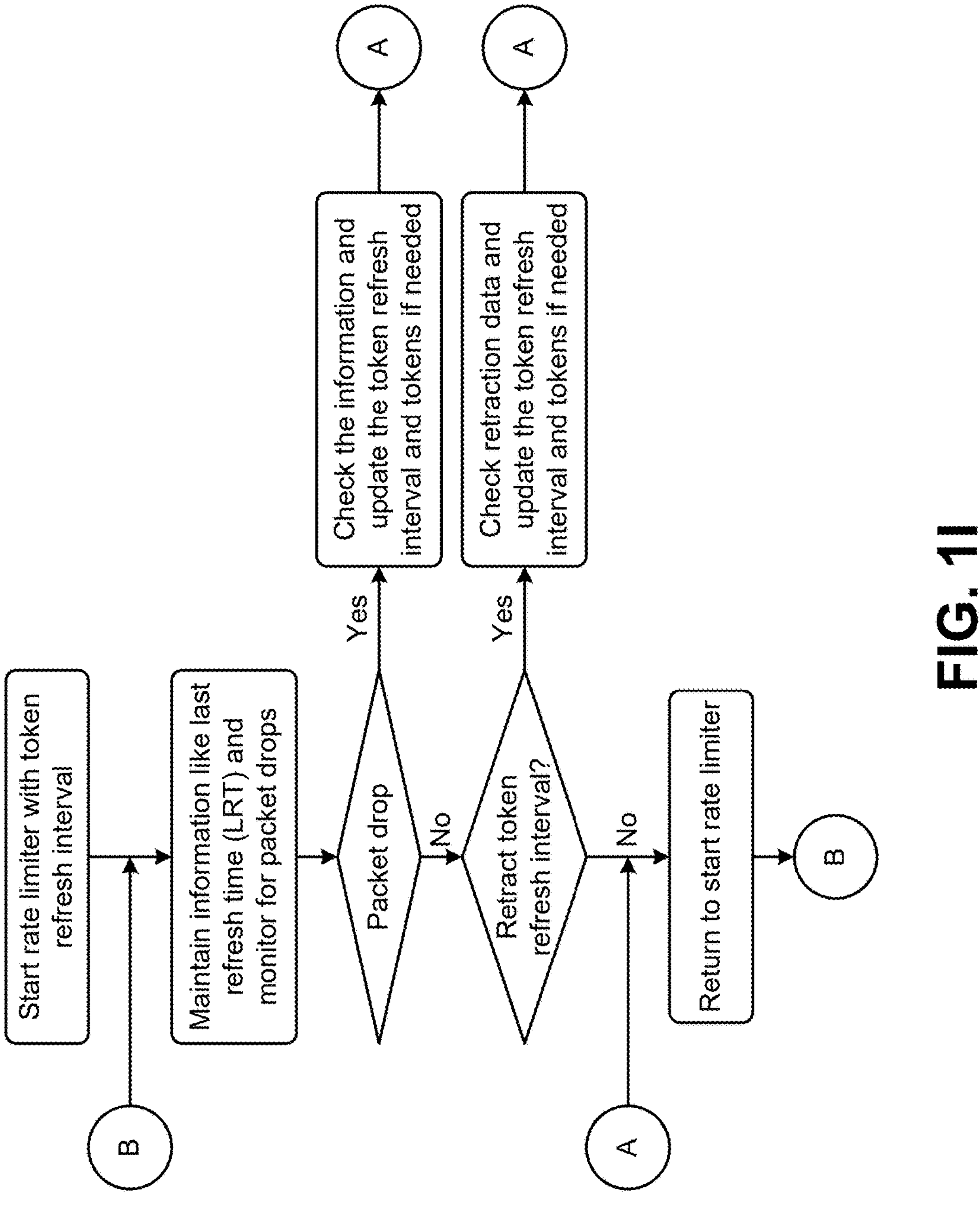

FIG. 1I depicts an example of a process flow capable of being performed by the network device. As shown, the network device may start the rate limiter with the state token refresh interval, may maintain information (such as the last refresh time (LRT)), and may monitor for packet drops. If a packet drop is detected, the network device may check the information, may update the token refresh interval and tokens if needed, and may return to starting the rate limiter. If a packet drop is not detected, the network device may determine whether to retract the token refresh interval. If the token refresh interval is to be retracted, the network device may check retraction data, may update the token refresh interval and tokens if needed, and may return to starting the rate limiter. If the token refresh interval is not to be retracted, the network device may return to starting the rate limiter.

In this way, the network device provides self-adjusting resource rate limiting based on a dynamic token refresh interval. For example, the network device may include a rate limiter that adapts to various forms of denial-of-service attacks (e.g., a burst attack) and protects against such denial-of-service attacks. The rate limiter may utilize a token bucket model with a token refresh interval that is more granularly enforced and dynamically tuned, so that the rate limiter may better adjust to traffic fluctuations and denial-of-service attacks. Thus, the network device conserves computing resources, networking resources, and/or the like that would otherwise have been consumed by processing illegitimate packets or requests associated with a burst data attack, handling customer complaints associated with legitimate packets or requests lost during the burst data attack due, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
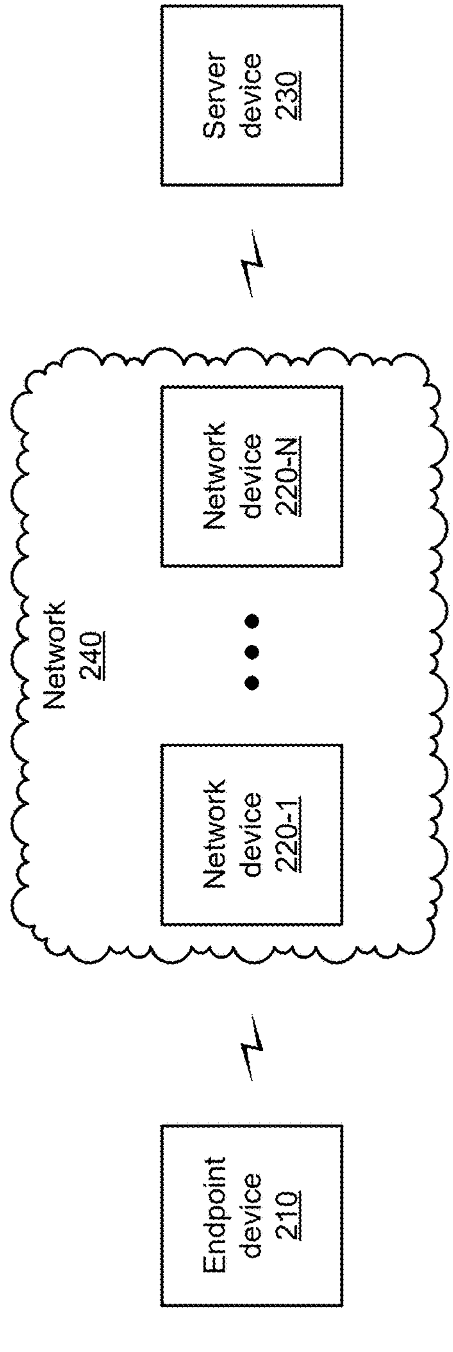
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, a server device, a group of server devices, or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, and/or a code division multiple access (CDMA) network), a public land mobile network (PLMN), a local area network (LAN), a WAN, a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
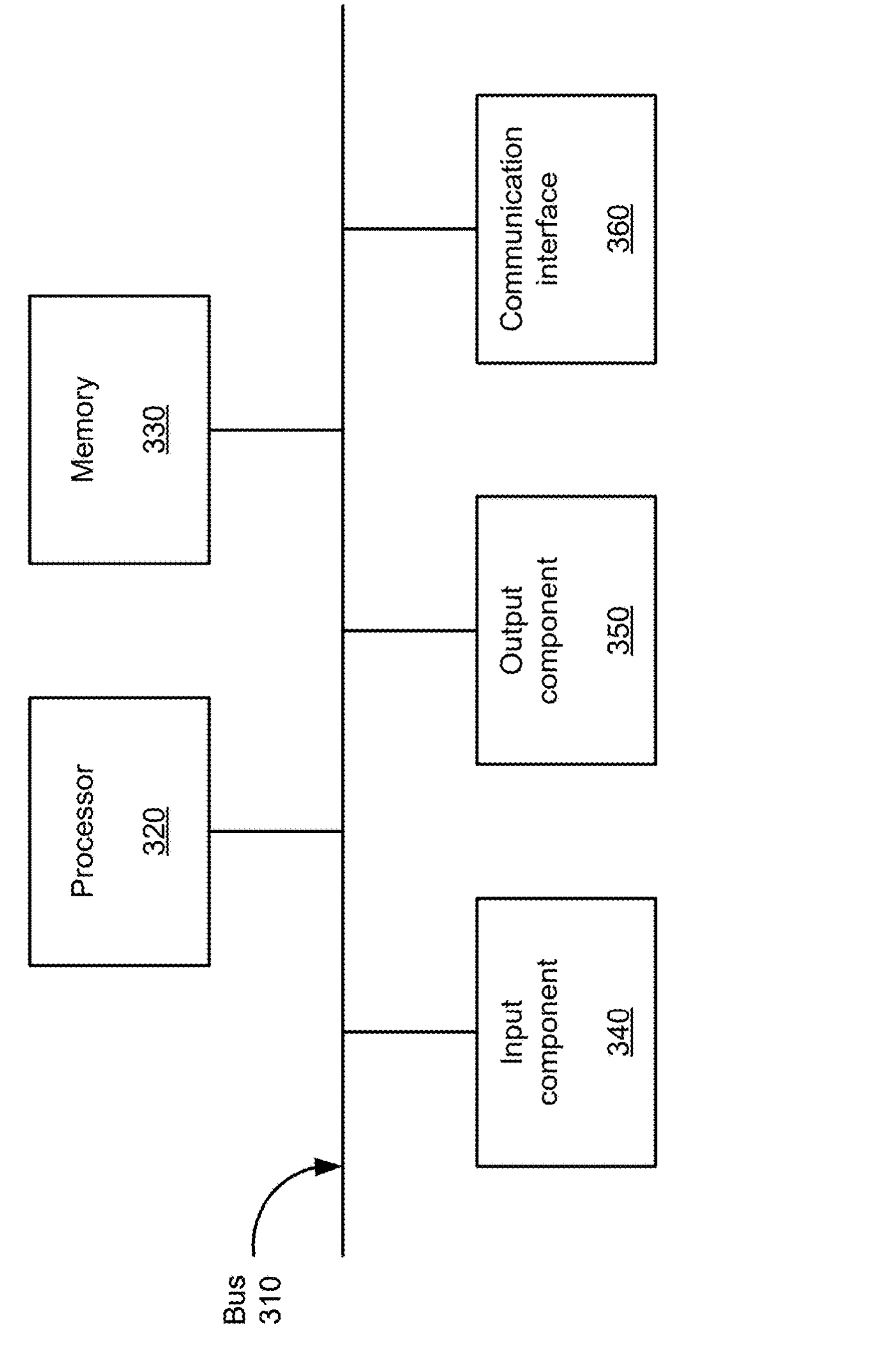
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), an accelerated processing unit (APU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
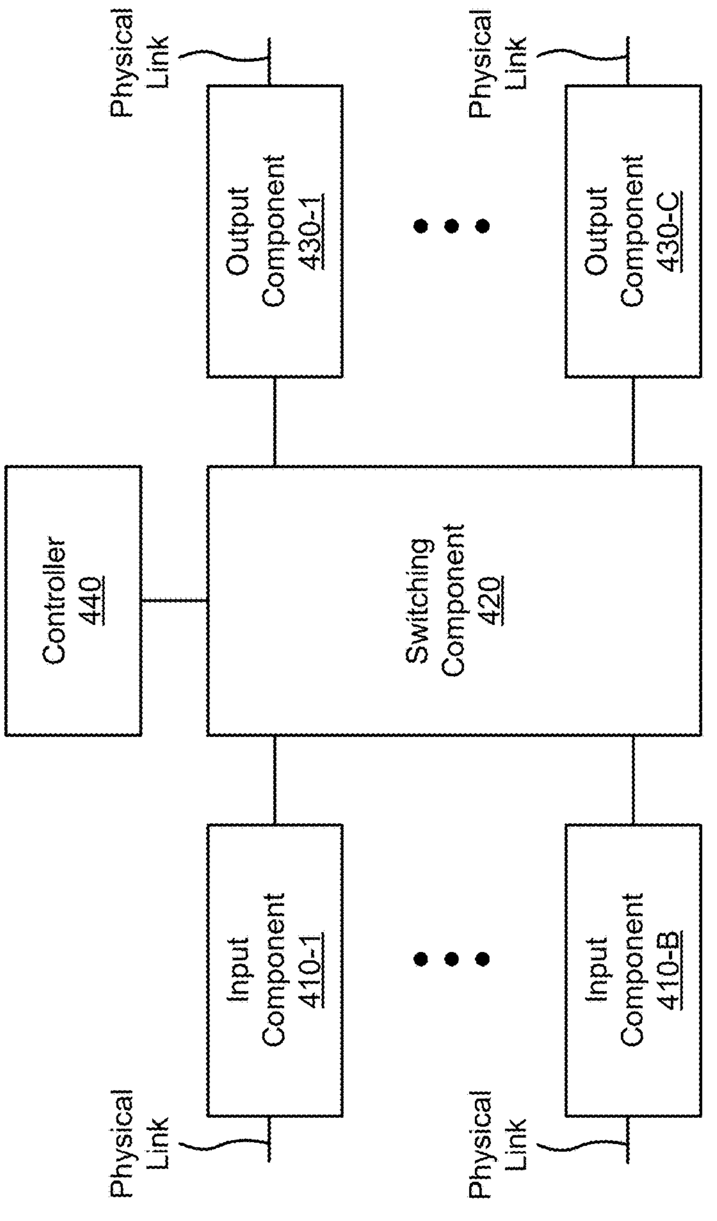

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
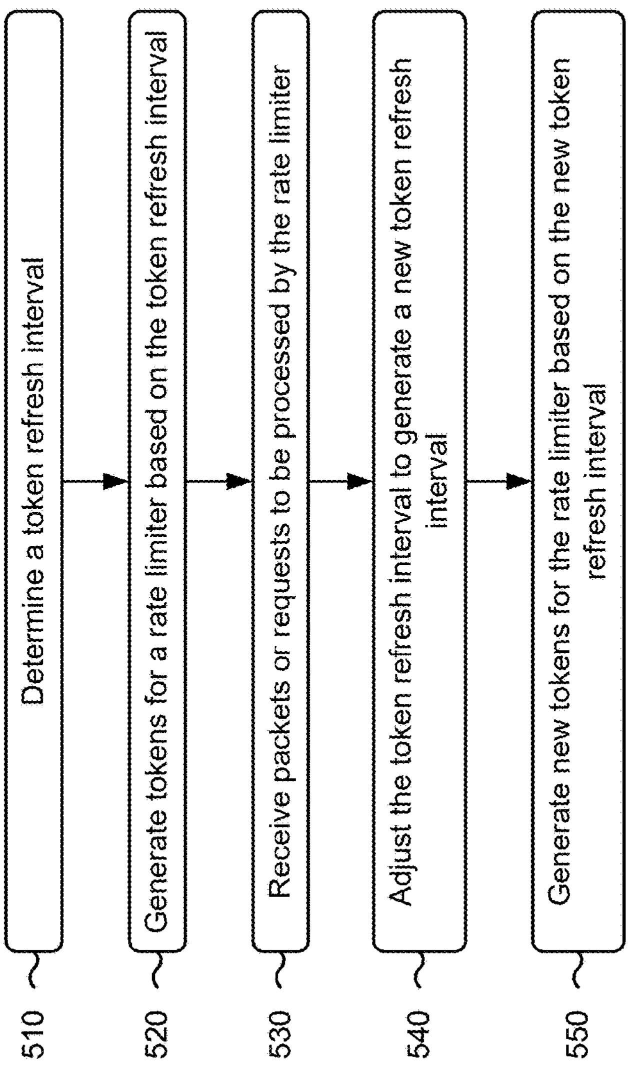
FIG. 5 is a flowchart of an example process for self-adjusting resource rate limiting based on a dynamic token refresh interval.
Figure 5:

FIG. 5 is a flowchart of an example process 500 for self-adjusting resource rate limiting based on a dynamic token refresh interval. In some implementations, one or more process blocks of FIG. 5 may be performed by a network device (e.g., a first network device 220). In some implementations, one or more process blocks of FIG. 5 may be performed by another device or a group of devices separate from or including the network device, such as an endpoint device (e.g., the endpoint device 210), a server device (e.g., the server device 230), and/or another network device (e.g., the network device 220). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include determining a token refresh interval (block 510). For example, the network device may determine a token refresh interval, as described above.

As further shown in FIG. 5, process 500 may include generating tokens for a rate limiter based on the token refresh interval (block 520). For example, the network device may generate tokens for a rate limiter based on the token refresh interval, as described above. In some implementations, the rate limiter includes one or more of a token bucket model, a leaky bucket model, or a sliding window model.

As further shown in FIG. 5, process 500 may include receiving packets or requests to be processed by the rate limiter (block 530). For example, the network device may receive packets or requests to be processed by the rate limiter, as described above.

As further shown in FIG. 5, process 500 may include adjusting the token refresh interval to generate a new token refresh interval (block 540). For example, the network device may adjust the token refresh interval to generate a new token refresh interval, as described above. In some implementations, adjusting the token refresh interval to generate the new token refresh interval includes monitoring a consumption of the tokens by the packets or requests during a time interval, and adjusting the token refresh interval based on the consumption and to generate the new token refresh interval. In some implementations, adjusting the token refresh interval to generate the new token refresh interval includes determining a current time that the rate limiter is depleted of the tokens, determining a token exhaustion interval based on the current time and a last refresh time that the tokens are generated, and adjusting the token refresh interval based on the token exhaustion interval and to generate the new token refresh interval.

As further shown in FIG. 5, process 500 may include generating new tokens for the rate limiter based on the new token refresh interval (block 550). For example, the network device may generate new tokens for the rate limiter based on the new token refresh interval, as described above. In some implementations, generating the new tokens for the rate limiter based on the new token refresh interval includes determining an adjustment counter based on packet or request drops by the rate limiter, and generating the new tokens for the rate limiter based on the adjustment counter and the new token refresh interval.

In some implementations, process 500 includes determining whether the token exhaustion interval is less than a threshold, and adjusting the token refresh interval based on the token exhaustion interval and to generate the new token refresh interval includes adjusting the token refresh interval to generate the new token refresh interval based on the token exhaustion interval being less than the threshold. In some implementations, process 500 includes determining a quantity of packet or request drops by the rate limiter, and adjusting the new token refresh interval to the token refresh interval, in steps and over a time period, based on the quantity of packet or request drops. In some implementations, process 500 includes generating additional tokens for the rate limiter based on the token refresh interval after the time period.

In some implementations, process 500 includes determining a quantity of packet or request drops by the rate limiter, and resetting the new token refresh interval to the token refresh interval based on the quantity of packet or request drops. In some implementations, process 500 includes generating additional tokens for the rate limiter based on the token refresh interval. In some implementations, the quantity of packet or request drops is equal to zero. In some implementations, process 500 includes utilizing the tokens for processing the packets or requests. In some implementations, process 500 includes receiving additional packets or requests to be processed by the rate limiter, and utilizing the new tokens for processing the additional packets or requests.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
determining, by a network device, a token refresh interval;
generating, by the network device, tokens for a rate limiter based on the token refresh interval and a token rate;
receiving, by the network device, packets or requests to be processed by the rate limiter;
determining a token exhaustion interval based on a difference between a current time at which the rate limiter is depleted of tokens and a last refresh time that the tokens are generated;
determining whether or not the token exhaustion interval indicates a burst attack;
based on a determination that the token exhaustion interval indicates a burst attack:
adjusting, by the network device, the token refresh interval to generate a new token refresh interval, and
adjusting by the network device, the token rate to generate a new token rate; and
generating, by the network device, new tokens for the rate limiter based on the new token refresh interval and the new token rate.

2. The method of claim 1,
wherein adjusting the token refresh interval to generate the new token refresh interval comprises:
monitoring a consumption of the tokens by the packets or requests during a time interval; and
adjusting the token refresh interval based on the consumption and to generate the new token refresh interval.

3. The method of claim 1,
wherein adjusting the token refresh interval to generate the new token refresh interval comprises:
adjusting the token refresh interval based on the token exhaustion interval and to generate the new token refresh interval.

4. The method of claim 3,
wherein determining whether or not the token exhaustion interval indicates a burst attack comprises:
determining whether the token exhaustion interval is less than a threshold.

5. The method of claim 1,
wherein generating the new tokens for the rate limiter based on the new token refresh interval comprises:
determining an adjustment counter based on packet or request drops by the rate limiter; and
generating the new tokens for the rate limiter based on the adjustment counter and the new token refresh interval.

6. The method of claim 1, further comprising:
determining a quantity of packet or request drops by the rate limiter; and
adjusting the new token refresh interval to the token refresh interval, in steps and over a time period, based on the quantity of packet or request drops.

7. The method of claim 6, further comprising:
generating additional tokens for the rate limiter based on the token refresh interval after the time period.

8. A network device, comprising:
one or more memories; and
one or more processors to:
determine a token refresh interval;
generate tokens for a rate limiter based on the token refresh interval and a token rate;
receive packets or requests to be processed by the rate limiter;
monitor a consumption of the tokens by the packets or requests during a time interval;
determine a token exhaustion interval based on a difference between a current time at which the rate limiter is depleted of tokens and a last refresh time that the tokens are generated;
determine whether or not the token exhaustion interval indicates a burst attack;
based on a determination that the token exhaustion interval indicates a burst attack:
adjust the token refresh interval based on the consumption and to generate a new token refresh interval, and
adjust the token rate to generate a new token rate; and
generate new tokens for the rate limiter based on the new token refresh interval and the new token rate.

9. The network device of claim 8,
wherein the one or more processors are further to:
determine a quantity of packet or request drops by the rate limiter; and
reset the new token refresh interval to the token refresh interval based on the quantity of packet or request drops.

10. The network device of claim 9,
wherein the one or more processors are further to:
generate additional tokens for the rate limiter based on the token refresh interval.

11. The network device of claim 9,
wherein the quantity of packet or request drops is equal to zero.

12. The network device of claim 8,
wherein the one or more processors are further to:
utilize the tokens for processing the packets or requests.

13. The network device of claim 8,
wherein the one or more processors are further to:
receive additional packets or requests to be processed by the rate limiter; and
utilize the new tokens for processing the additional packets or requests.

14. The network device of claim 8,
wherein the rate limiter includes one or more of a token bucket model, a leaky bucket model, or a sliding window model.

15. A non-transitory computer-readable medium storing a set of instructions, the set of instructions comprising:
one or more instructions that, when executed by one or more processors of a network device, cause the network device to:
determine a token refresh interval and a token rate;
generate tokens for a rate limiter based on the token refresh interval and the token rate;

receive packets or requests to be processed by the rate limiter;

determine a token exhaustion interval based on a difference between a current time at which the rate limiter is depleted of tokens and a last refresh time that the tokens are generated;

determine whether or not the token exhaustion interval indicates a burst attack;

based on a determination that the token exhaustion interval indicates a burst attack:

adjust the token refresh interval based on the token exhaustion interval and to generate a new token refresh interval, and adjust the token rate to generate a new token rate; and generate new tokens for the rate limiter based on the new token refresh interval and the new token rate.

16. The non-transitory computer-readable medium of claim 15, wherein the one or more instructions, to determine whether or not the token exhaustion interval indicates a burst attack, further cause the network device to:

determine whether the token exhaustion interval is less than a threshold.

17. The non-transitory computer-readable medium of claim 15, wherein the one or more instructions, that cause the network device to generate the new tokens for the rate limiter based on the new token refresh interval, cause the network device to:

determine an adjustment counter based on packet or request drops by the rate limiter; and generate the new tokens for the rate limiter based on the adjustment counter and the new token refresh interval.

18. The non-transitory computer-readable medium of claim 15, wherein the one or more instructions further cause the network device to:

determine a quantity of packet or request drops by the rate limiter;

adjust the new token refresh interval to the token refresh interval, in steps and over a time period, based on the quantity of packet or request drops; and generate additional tokens for the rate limiter based on the token refresh interval after the time period.

19. The non-transitory computer-readable medium of claim 15, wherein the one or more instructions further cause the network device to:

determine a quantity of packet or request drops by the rate limiter;

reset the new token refresh interval to the token refresh interval based on the quantity of packet or request drops; and generate additional tokens for the rate limiter based on the token refresh interval.

20. The non-transitory computer-readable medium of claim 15, wherein the one or more instructions further cause the network device to:

utilize the tokens for processing the packets or requests;

receive additional packets or requests to be processed by the rate limiter; and utilize the new tokens for processing the additional packets or requests.

* * * * *